US012743826B2

(12) United States Patent
Gao et al.

(10) Patent No.: US 12,743,826 B2
(45) Date of Patent: Sep. 22, 2026

(54) UNCOVERING PATTERNS IN TEXT THROUGH CLUSTERING

(71) Applicant: Microsoft Technology Licensing, LLC, Redmond, WA (US)

(72) Inventors: Ryan Wang Gao, Seattle, WA (US); Lea Vega Romero, Redmond, WA (US); Gaurav Anil Yeole, Redmond, WA (US); Sekhar P. Chintalapati, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 183 days.

(21) Appl. No.: 18/644,076

(22) Filed: Apr. 23, 2024

(65) Prior Publication Data

US 2025/0329074 A1 Oct. 23, 2025

(51) Int. Cl.

| | |
|---|---|
| ***G06T 11/20*** | (2026.01) |
| ***G06F 16/35*** | (2019.01) |
| ***G06F 16/901*** | (2019.01) |
| ***G06F 21/62*** | (2013.01) |
| ***G06T 11/26*** | (2026.01) |

(52) U.S. Cl.

CPC .............. *G06T 11/26* (2026.01); *G06F 16/35* (2019.01); *G06F 16/9024* (2019.01); *G06F 21/6254* (2013.01)

(58) Field of Classification Search

None

See application file for complete search history.

(56) References Cited

U.S. PATENT DOCUMENTS

| | | | | |
|---|---|---|---|---|
| 10,956,522 | B1 * | 3/2021 | Jha | G06N 3/0499 |
| 11,907,307 | B1 * | 2/2024 | Strelnikoff | G06F 16/906 |
| 2017/0063892 | A1 * | 3/2017 | Bartos | H04L 63/1425 |
| 2018/0196873 | A1 * | 7/2018 | Yerebakan | G16H 15/00 |
| 2019/0089721 | A1 * | 3/2019 | Pereira | G06F 16/951 |
| 2019/0182273 | A1 * | 6/2019 | Walsh | H04L 63/1425 |
| 2019/0182382 | A1 * | 6/2019 | Mazza | H04M 3/527 |
| 2020/0073932 | A1 * | 3/2020 | Jia | G06F 16/9024 |
| 2020/0112574 | A1 * | 4/2020 | Koral | H04L 63/0254 |

(Continued)

OTHER PUBLICATIONS

Abualigah. et al., "Text Summarization: A Brief Review," In Recent Advances in NLP: The Case of Arabic Language; Springer: Berlin/Heidelberg, Germany, 2020, pp. 1-15.

(Continued)

*Primary Examiner* — Sultana M Zalalee

(74) *Attorney, Agent, or Firm* — Barta Jones, PLLC

(57) ABSTRACT

Example solutions for clustering data include: encoding a plurality of source records into a plurality of vectors, each source record containing source terms being encoded as one vector of the plurality of vectors; computing a similarity score for each unique pair of vectors of the plurality of vectors; constructing a similarity graph by: adding a node to the similarity graph for each vector; and adding an edge between each pair of nodes in which the similarity score for the associated pair of vectors exceeds a first similarity threshold; identifying a cluster of nodes within the similarity graph, the cluster of nodes representing a disconnected subgraph within the similarity graph; and generating a graphical representation of the one or more clusters on a display device.

20 Claims, 11 Drawing Sheets

(56) References Cited

U.S. PATENT DOCUMENTS

| | | | | |
|---|---|---|---|---|
| 2020/0125727 | A1* | 4/2020 | Wu | G06F 40/289 |
| 2020/0301972 | A1* | 9/2020 | Wang | G06N 20/10 |
| 2020/0311414 | A1* | 10/2020 | Enuka | G06F 16/353 |
| 2021/0295822 | A1* | 9/2021 | Tomkins | G10L 15/197 |
| 2021/0397500 | A1* | 12/2021 | Wieder | G06F 11/3495 |
| 2023/0102892 | A1* | 3/2023 | Wu | G06F 40/30<br>707/737 |
| 2023/0130502 | A1* | 4/2023 | Zou | G06F 16/906<br>707/737 |
| 2024/0161108 | A1* | 5/2024 | Madisetti | G06Q 20/389 |
| 2024/0289384 | A1* | 8/2024 | Fountoulakis | G06F 16/313 |

OTHER PUBLICATIONS

Aggarwal, Charu C. et al., "An Introduction to Text Mining", In Mining text data, Jan. 1, 2012, pp. 1-10.

Feldman. et al., "Knowledge discovery in textual databases (KDT)", In proceedings of the First International Conference on Knowledge Discovery and Data Mining (KDD-95), AAAI Press, Jun. 1995, 11 pages.

Lahitani, et al., "Cosine similarity to determine similarity measure: Study case in online essay assessment." In 2016 4th International conference on cyber and IT service management, IEEE, Sep. 29, 2016, pp. 1-6.

Marti A. Hearst, et al., "Text Data Mining: Issues, Techniques, and the Relationship to Information Access," Jul. 1997, pp. 1-13.

Ratcliff, J. W, et al., "Pattern-matching-the gestalt approach", retrieve from: http://www.drdobbs.com/database/pattern-matching-the-gestalt-approach/184407970, Jul. 1, 1988, 10 pages.

Salton, et al., "On the construction of effective vocabularies for information retrieval." Acm Sigplan Notices, vol. 10, Issue No. 1, Nov. 4, 1973, pp. 48-60.

Shi, et al., "Market Segmentation by Travel Motivations under a Transforming Economy: Evidence from the Monte Carlo of the Orient," Sustainability 2018, vol. 10, Issue No. 3395, Sep. 23, 2018, pp. 1-11.

Tan, A. H, et al., "Text mining: The state of the art and the challenges", In Proceedings of the pakdd 1999 workshop on knowledge disocovery from advanced databases, Nov. 2000, vol. 8, pp. 1-7.

* cited by examiner

CLUSTERING DEVICE 110

TEXT CLUSTERING 120

SOURCE RECORDS (TEXT) 122

CLUSTERS (CLUSTER ID PER RECORD) 124

CLUSTER PATTERN 130

PATTERN (PER CLUSTER) 132

CLUSTER NEIGHBORHOOD 140

TOP NEIGHBORS (PER CLUSTER) 142

CLUSTER CORRELATION 150

CORRELATED CLUSTERS 152

CLUSTER EDITIONS 160

MERGE/SPLIT CLUSTER(S) 162

UI 190

101

DB 106

INPUT DATASET 108

104

USER

102

UNCOVERING PATTERNS IN TEXT THROUGH CLUSTERING

BACKGROUND

Text mining systems are utilized to extract valuable insights from unstructured textual data. This field, also known as knowledge discovery, text analytics or natural language processing (NLP), employs a variety of methods to analyze, interpret, and derive meaning from textual databases or other text-based documents and sources. These techniques encompass tasks such as tokenization, stopwords removal, stemming and lemmatization, named entity recognition (NER), part-of-speech (POS) tagging, term frequency-inverse document frequency (TF-IDF) analysis, topic modeling, sentiment analysis, text classification, text summarization, word embeddings, and named entity disambiguation. By applying these methods, text mining enables organizations to gain actionable insights from sources like social media, customer feedback, news articles, log files, and scientific literature, facilitating informed decision-making and enhancing various applications across industries.

SUMMARY

The disclosed examples are described in detail below with reference to the accompanying drawing figures listed below. The following summary is provided to illustrate some examples disclosed herein. The following is not meant, however, to limit all examples to any particular configuration or sequence of operations. Example solutions for clustering source data include: encoding a plurality of source records into a plurality of vectors, each source record containing source terms being encoded as one vector of the plurality of vectors; computing a similarity score for each unique pair of vectors of the plurality of vectors, the similarity score being a value representing how similar the two associated vectors are to each other; constructing a similarity graph by: adding a node to the similarity graph for each vector of the plurality of vectors, each node being associated with one vector of the plurality of vectors and one source record of the plurality of source records; and adding an edge between each pair of nodes in which the similarity score for the associated pair of vectors exceeds a first similarity threshold; identifying one or more clusters of nodes within the similarity graph, each cluster of nodes representing a disconnected subgraph within the similarity graph; and generating a graphical representation of the one or more clusters on a display device.

BRIEF DESCRIPTION OF THE DRAWINGS

The disclosed examples are described in detail below with reference to the accompanying drawing figures listed below.

Corresponding reference characters indicate corresponding parts throughout the drawings. Any of the drawings may be combined into a single example or embodiment.

DETAILED DESCRIPTION

Figure 1:
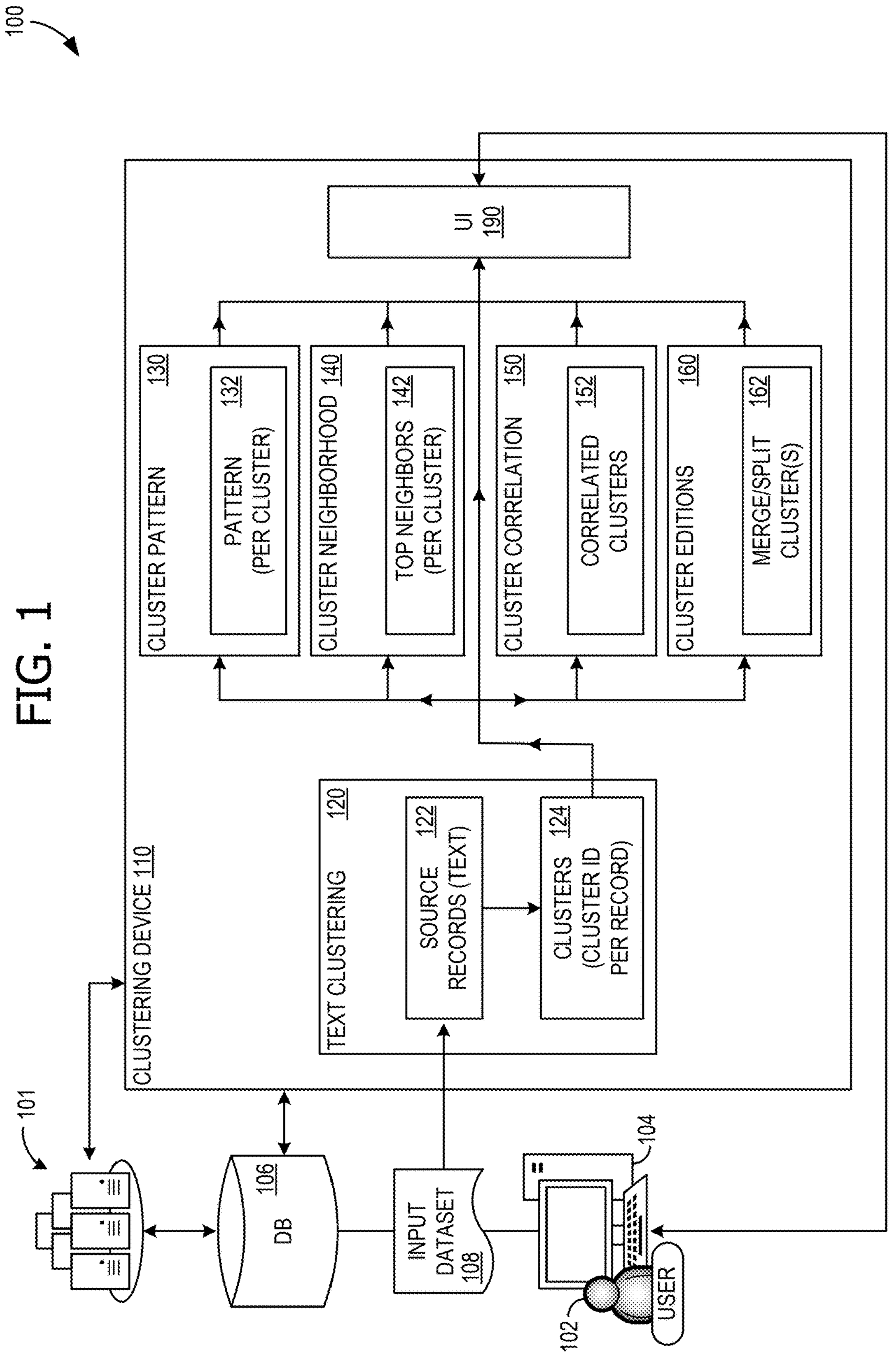
FIG. 1 illustrates an example architecture in which a clustering device performs various cluster-related operations an input dataset.

In the field of text mining, non-trivial patterns or knowledge is extracted from documents. These documents could be unstructured text documents, log files, databases, or the like. Text clustering is one of the central problems in text mining and information retrieval. Text clustering involves grouping similar text samples together, based on partitioning a collection of text into associated clusters. Text samples inside of a cluster should be as similar as possible and dissimilar from text samples in other clusters. By grouping these text samples into clusters, the information contained by the text sample in the cluster should be more easily accessible.

In examples, a text clustering system is provided that uses a combination of machine learning techniques and other text analytics techniques to extract knowledge from text. More specifically, the text clustering system divides the input data into clusters, determines a pattern for each cluster, and identifies neighborhoods between the clusters based on certain similarities.

In examples, the text clustering system operates on a log file or database that contains records of security-related log events (e.g., telemetry data from a security service, where each record is a row or line that contains delimited text data representing a single event). To cluster these records, the system initially encodes and vectorizes each record of this input dataset (e.g., using term frequency-inverse document frequency (TF-IDF) encoding), yielding a vector for each record. The system builds a similarity matrix for this set of records, where each element of the similarity matrix contains a value (a "similarity score") representing the similarity between two vectors (e.g., a cosine similarity score computed between the vector of that row and the vector of that column). The system then uses the similarity matrix to construct a relationship graph where each node in the graph is one of the records and where edges are created between two nodes based on similarity values from the similarity matrix. More specifically, an edge is created between two nodes when the cosine similarity score in the similarity matrix exceeds a similarity threshold. As such, the system then uses this graph to identify clusters within the graph (e.g., sets of connected nodes). Each of these clusters is assigned a unique cluster ID. Because any particular node is a member of one cluster, each record is assigned to that cluster ID. As such, in the example of security events, this groupings of records into clusters allows the user to view related events. In the security telemetry example, each cluster may thus contain multiple events related to a single root cause, allowing the user to view and remediate all such related events, rather than having to identify and remediate each event separately.

In some examples, the system determines a pattern or template (e.g., a regular expression (REGEX)) for each cluster based on the records in that cluster. The pattern may then be used against other records to determine whether any of those other records may be related to that cluster. In some examples, the system may identify neighbors between the clusters. Clusters that are neighbors of each other are those clusters that have some node pairs (e.g., a node in one cluster and another node in the other cluster) that have a moderately high similarity score (e.g., a similarity score that is not high enough to have caused an edge to be created between those two nodes, but a score that exceeds some lower threshold). When two clusters share enough node pairs with moderate similarity scores, the system identifies those clusters as neighbor clusters with each other.

Examples of the text clustering system improve computational performance and reduce network bandwidth usage during analytical operations by identifying clusters of related records. The encoding of source records into vectors allows the system to compute similarity scores between each pair of vectors. These similarity scores are then used to construct a similarity graph in which edges are added between nodes when their similarity scores exceed a threshold. This similarity graph may then be used to identify clusters of nodes, and thus clusters of records. When performing analytics such as investigating security events such as personally identifiable information (PII) leaks, the system generates the similarity graph and identifies the clusters automatically for the user, allowing the user to quickly identify a root cause for any given cluster. The system thus reduces computational overhead (e.g., reduces computer resource usage) that would have been needed had the user performed individual investigations of each individual record.

The various examples are described in detail with reference to the accompanying drawings. Wherever preferable, the same reference number is used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 in which a clustering device 110 performs various cluster-related operations an input dataset 108. In examples, a computing infrastructure 101 generates telemetry data from a security service (e.g., records related to security events occurring within the infrastructure 101) and this telemetry data is recorded in a database 106 (e.g., as a log file, an events database, or the like). This telemetry data is used as the example input dataset 108 for purposes of explanation of various cluster analytics and features provided by the clustering device 110. These cluster analytics operate to identify related groups of records (e.g., "clusters") within the input dataset 108, such as security events that share the same root cause, thus allowing a user 102 (e.g., via a user computing device 104 and a user interface (UI) 190 provided by the clustering device 110) to troubleshoot and remediate such security issues for groups of security events, rather than via manual analysis of individual events.

More specifically, in the example, the text clustering device 110 provides text clustering 120 that operates to identify clusters 124 from the input dataset 108, where each cluster 124 includes a set of one or more source records 122 from the input dataset 108 that are similar in some respect. The text clustering device 110 also provides several subsidiary cluster features that leverage these clusters 124. Cluster pattern 130 is configured to identify a pattern 132 (e.g., a REGEX pattern) for each cluster 124, where the pattern 132 represents a template that is used to evaluate other records to determine which such records may also be similar to the records of this cluster 124. Cluster neighborhood 140 is configured to identify one or more top neighbors 142 of a given cluster 124, where top neighbors 142 are clusters that contain nodes that are somewhat similar to nodes in the cluster 124 but not similar enough to have been merged into that cluster 124. Cluster correlation 150 is configured to allow users to identify correlations between multiple clusters over time. For example, suppose the text clustering 120 runs daily on groups logs of errors. On day T, the text clustering 120 identifies three clusters, X, Y, and Z. On day T+1, the text clustering 120 identifies two clusters, A and B. However, the errors in cluster X on day T are the same as the errors in cluster A on day T+1 (e.g., because the issue was not resolved). By using the cluster correlation 150 on the clusters from both days, the user 102 can see this connection. Cluster editions 160 is configured to perform merge/split cluster 162 operations, allowing the user 102, for example, to merge multiple clusters 124 into a single, larger cluster, or to split a cluster 124 into multiple smaller clusters. Each of these functions 120, 130, 140, 150, 160 are described in further detail below.

While many of the examples provided herein are described in the context of the input dataset 108 being generated by a security service in a cloud environment of the computing infrastructure 101, it should be understood that any source of data that enables the systems and methods described herein is within the scope of this disclosure.

Figure 2:
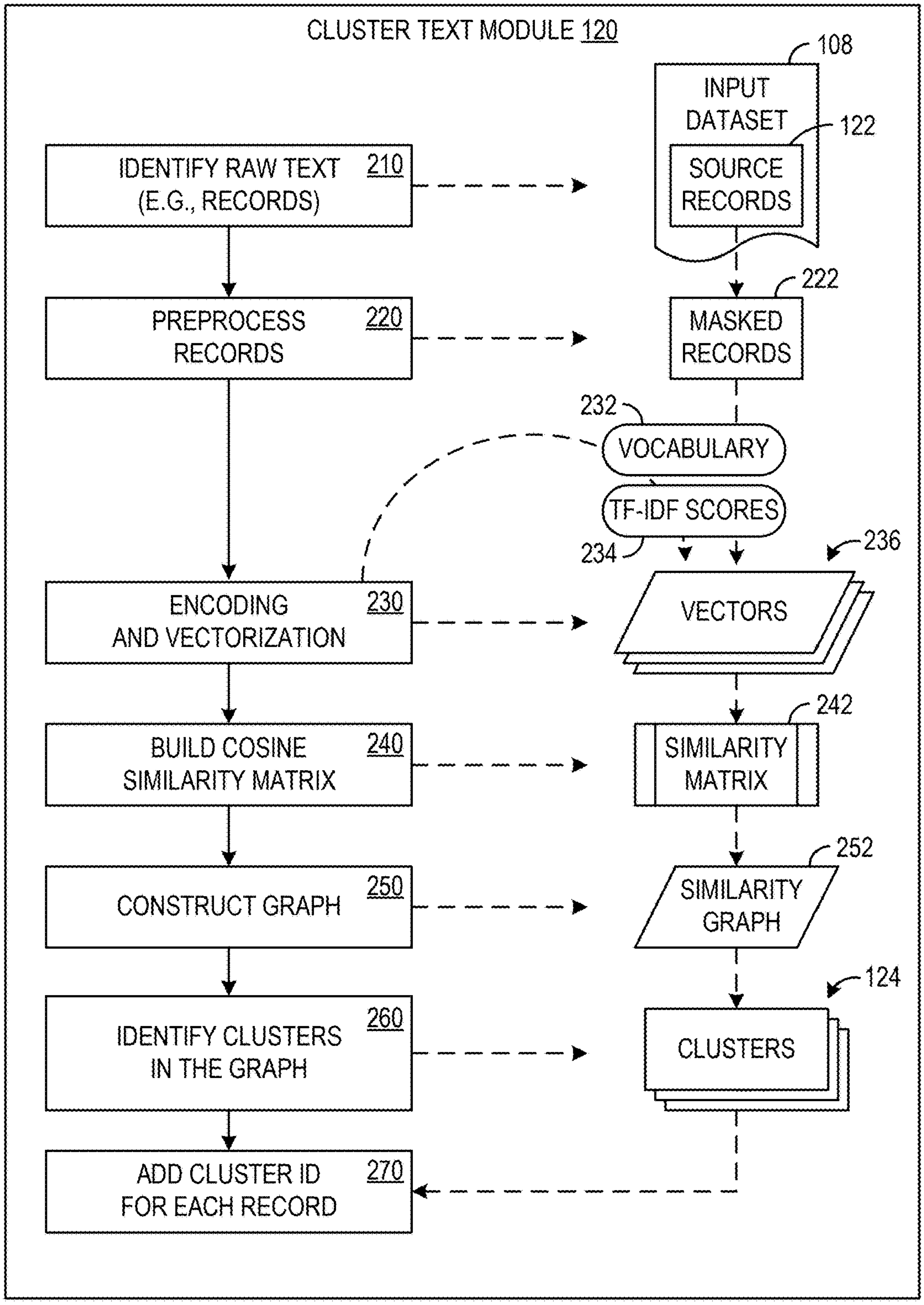
FIG. 2 illustrates operational details performed by the text clustering of FIG. 1 when clustering source records of the input dataset.
Figure 3:
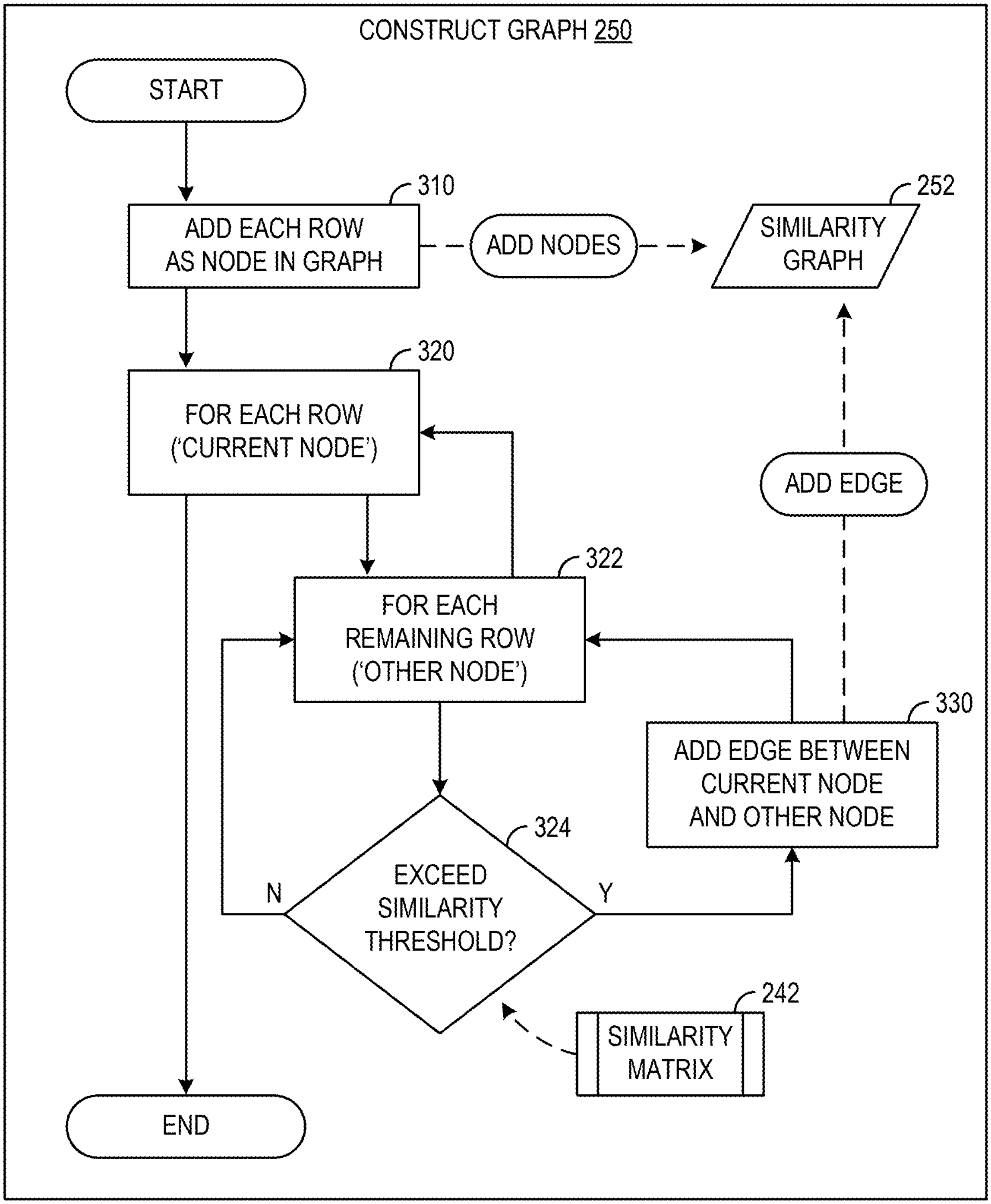
FIG. 3 is a flow chart illustrating example operations for constructing the similarity graph of shown in FIG. 2.

FIG. 2 illustrates operational details performed by the text clustering 120 of FIG. 1 when clustering source records 122 of the input dataset 108. In FIG. 2 and FIG. 3, solid line is used to indicate process flow between operations and broken line is used to identify various data or data structures created or otherwise used by particular operations, as well as data or data structures used to create other data or data structures. In the example, the text clustering 120 is configured to identify clusters 124 within the input dataset 108 through analysis of the source records 122. Here, each of the source records 122 represents individual events (e.g., security events), where each event generates one or more data elements (e.g., "words") that are included in the records 122. For example, the input dataset 108 may be a log file in which each line of the log file is treated as an individual record 122, where each line is delimited (e.g., comma, semicolon, space, or the like) into one or more data segments, and where each delimited data segment includes one or more words. In other examples, the records 122 may be rows of a relational database table, where each data segment is a column (e.g., a field) of that table. In still other examples, each of the records 122 may be individual documents (e.g., text-based documents). At operation 210, the text clustering 120 identifies the "raw text" of this input dataset 108 (e.g., uniquely identifying each of the source records 122 from the input dataset 108).

Consider the following example input dataset for a log with personally identifiable information (PII):

TABLE 1

Example Raw Text Records with PII.

| Rec.# | Record Content |
|---|---|
| 1 | ...3.474Z” NotOnOrAfter=“2022-05-14T04:58:43.474Z”><br><AudienceRestriction><Audience><br>svc://company@example.com/</Audience><<br>/AudienceRestriction></Conditions><AttributeStatement><Attri |
| 2 | ...3.474Z” NotOnOrAfter=“2022-05-14T04:58:43.474Z”><br><AudienceRestriction><Audience><br>svc:// company@example.com/</Audience><<br>/AudienceRestriction></Conditions><AttributeStatement><Attri |
| 3 | “e00ddcdf-1e0f-4be5-a37a-894a4731986a”,<br>“http://example.com/identity/claims/name”:“ab087@example.com”,<br>“http://example.com/identity/claims/upn”:“ab087@example.com”, “uti”:“mwo” |
| 4 | “0256c182-9ca1-11148-8ca9-12fcdf9f56f7”,<br>“http://example.com/identity/claims/name”:“abc__adm@ example.com”,<br>“http:// example.com/identity/claims/upn”:“abc__adm@ example.com”,“uti”:“H” |

This example telemetry data of Table 1 shows four records numbered 1 to 4 formatted in two different templates (e.g., records 1 and 2 being semi-colon delimited, records 3 and 4 being comma delimited). As such, the text clustering 120 is configured with various templates that enable the text clustering 120 to segment each record 122 into multiple data segments (e.g., where different types of events may be written with different data, perhaps from different sources, and thus may have different templates that are used to parse that type of record 122). In examples, each data segment is treated as an individual “word” (e.g., all of the characters between any two delimiters). As such, each record 122 is broken into one or more data segments.

In some examples, the text clustering 120 performs one or more preprocessing operations on the source records 122 (e.g., to prepare the input dataset 108 for the vectorization operations to come). For example, consider the example raw text records shown above in Table 1. Some of these source records 122 include various data elements that are advantageously replaced (e.g., masked) before encoding and vectorization. In some examples, PII data components such as email addresses, globally unique identifiers (GUIDs), and IP addresses are replaced with a mask identifier (e.g., “<EMAIL>”, “<IPADDR>”, or “<GUID>”). Such data components may be modified with such masks in order to protect the PII information (e.g., from viewing by the user 102). In some examples, some data components that are not helpful for clustering may similarly be replaced with a mask identifier, such as timestamps (e.g., “<TIMESTAMP>”). As such, at operation 220, the text clustering 120 preprocesses the source records 122 to generate masked records 222 (e.g., modified versions of the source records 122 with certain data components being edited to replace certain content with masks). After such processing, for example, the four records of Table 1 are edited into the following masked records 222:

TABLE 2

Example Masked Records.

| Rec.# | Record Content |
|---|---|
| 1 | ...3.474Z” NotOnOrAfter=“<TIMESTAMP>”><br><AudienceRestriction><Audience><br>svc://<EMAIL>/</Audience><<br>/AudienceRestriction></Conditions><AttributeStatement><Attri |
| 2 | ...3.474Z” NotOnOrAfter=“<TIMESTAMP>”><br><AudienceRestriction><Audience><br>svc://<EMAIL>/</Audience><<br>/AudienceRestriction></Conditions><AttributeStatement><Attri |
| 3 | “<GUID>”, “http://example.com/identity/claims/name”:“<EMAIL>”, “http://<br>example.com/identity/claims/upn”:“<EMAIL>”, “uti”:“mwo” |
| 4 | “<GUID>”, “http:// example.com/identity/claims/name”:“<EMAIL>”,<br>“http:// example.com/identity/claims/upn”:“<EMAIL>”,“uti”:“H” |

As such, the timestamps in the source records 122 of example records 1 and 2 have been replaced, in the masked records 222, with “<TIMESTAMP>”, and the email addresses have similarly been replaced with “<EMAIL>”.

In some examples, the operation 220 includes preprocessing the source records 122 with the Python library “Scikit-learn”. Operation 220 includes, for example, removing special characters, managing missing values, removing missing data or duplicate rows, and the like.

At operation 230, the text clustering 120 performs encoding and vectorization using the masked records 222. In examples, operation 230 includes performing standardization (e.g., StandardScaler), min-max scaling (e.g., MinMaxScaler), robust scaling (e.g., RobustScaler), normalization (e.g., Normalizer), encoding categorical features (e.g., OneHotEncoder, LabelEncoder), imputation of missing values (e.g., SimpleImputer), or the like. This operation 230 also includes converting each of the records 222 into a vectorized representation, shown here as vectors 236. More specifically, in examples, the text clustering 120 uses TF-IDF to tokenize the input text data of the masked records 222 and to generate a vocabulary 232 from all the data components (e.g., words or terms) appearing in corpus of masked records 222 (e.g., where each record 222 is treated as a 'document' under TF-IDF). This vocabulary 232 thus assigns a unique term identifier for each unique data component in the corpus of masked records 222. The text clustering 120 then computes a TF-IDF score 234 for each term-document pair, where the score 234 for a given pair reflects how important that particular term is to a document (e.g., a record 222) relative to the other documents in the corpus (e.g., amongst all the records 222). Finally, operation 230 includes encoding each of the records 222 into their own vectors 236 (e.g., one vector 236 per record 222) using the scores 234. As such, each vector 236 corresponds to a particular record 222 and comprises a sparse one-dimensional array of length X of floating point values (e.g., where X is the number of terms in the vocabulary 232). Further, each element (e.g., column) of the vector 236 is associated with a particular term of the vocabulary 232, and the column associated with each term that appears in a given record 222 is populated with a non-zero value (e.g., the TF-IDF score 234 for that term-document pair), where all other columns are zero (e.g., for terms that do not appear in that record 222).

As such, each masked record 222 has an associated vector 236. In some examples, these vectors 236 may be stored as an encoded matrix (not shown), where each row of the encoded matrix represents one of the masked records 222 and is populated with the values of the associated vector 236 for that record 222, and where the columns represent the terms of the vocabulary 232 (e.g., as with the vectors 236). While the example operation 230 is performed on the masked records 222, in other examples, the operation 230 may be performed directly on the source records 122 (e.g., in non-masked examples, using source records 122 in lieu of masked records 222).

While the example operation 230 performs encoding and vectorization using TF-IDF, other embodiments are possible. For example, operation 230 may instead use Bag-of-Words (BoW) encoding, a word embeddings model (e.g., Word2Vec, GloVe, fastText), paragraph vectors (e.g., Doc2Vec), Term Frequency-Inverse Sentence Frequency (TF-ISF), or N-grams. In BoW examples, BoW gives the same importance to all words (e.g., even if they vary in frequency across documents). As such, operation 230 may include normalizing a BoW matrix before computing the similarity between document pairs. In word embedding examples, word embedding models offer a more complex and informative word representation. However, they also introduce more noise and are more computationally intensive than TF-IDF.

At operation 240, in the example, the text clustering 120 builds a cosine similarity matrix (or just "similarity matrix") 242 using the vectors 236. More specifically, the similarity matrix 242 is constructed as two-dimensional, n by n matrix, where n is the number of masked records 222 (and thus also the number of vectors 236). Each element of the matrix corresponds to a pairing of two vectors 236, where the row identifies one vector 236 and the column identifies another vector 236. For example, the element at [4, 10] (e.g., row, column) of the similarity matrix 242 is associated with the [4] vector 236 and the vector 236. For each element of the similarity matrix 242, the cluster text 120 computes a similarity value between the two associated vectors 236 and stores that similarity value as that element of the similarity matrix 242. In the example, the similarity value is computed as a cosine similarity between the two vectors 236 (e.g., the cosine of the angle between the two vectors 236), indicating how similar the two vectors 236 (e.g., and thus the two records 222) are to each other. The similarity matrix 242 is thus a symmetric matrix, as each element on the diagonal represents a comparison of that particular vector to itself, and each other element [i, j], has the same value as element [j, i] (e.g., as they are both cosine similarity values between the same two vectors i and j).

In other examples, operation 240 may use a different similarity score to build the similarity matrix 242 (e.g., in lieu of Cosine Similarity). For example, operation 240 may compute Euclidean distance (e.g., considering magnitude of differences between the two vectors, rather than just their orientation, as in cosine similarity), Pearson Correlation Coefficient (e.g., measuring the linear correlation between two vectors), Jaccard Similarity, Word Mover's Distance (WMD), Hellinger Distance, Kullback-Leibler (KL) Divergence, or Soft Cosine Similarity (e.g., an extension of cosine similarity that considers the semantic similarity between words by using a pre-trained word embedding model). Regarding Euclidean distance, Euclidean distance is sensitive to the magnitude and scale of the vectors, while cosine similarity only depends on their orientation. This means that two vectors that are parallel but have different lengths will have a cosine similarity of 1, but a non-zero Euclidean distance. Conversely, two vectors that have the same length but are orthogonal will have a cosine similarity of 0, but a non-zero Euclidean distance. Cosine similarity captures semantic similarity between documents or words regardless of their length or frequency. Regarding Pearson Correlation Coefficients, this assumes that the vectors are normally distributed and centered around zero, while cosine similarity does not. Pearson correlation coefficients also range from −1 to 1, indicating the direction and strength of the correlation, while cosine similarity ranges from 0 to 1, indicating the degree of alignment. Cosine similarity captures semantic similarity between documents or words regardless of their mean or variance. Regarding Jaccard Similarity, Jaccard Similarity is defined as the ratio of the intersection to the union of the two sets, while cosine similarity is defined as the dot product of the two vectors divided by their norms. Jaccard similarity is often used for binary or categorical data, such as presence or absence of features, while cosine similarity is used for continuous or numerical data, such as word frequencies or ratings. Jaccard similarity can be seen as a special case of cosine similarity, when the vectors are binary and normalized. Regarding WMD, WMD is based on the idea of moving words from one text to another, minimizing the total distance traveled, where the distance between words is given by a pretrained word embedding model. Cosine similarity is based on the idea of comparing the average direction of the words in each text, where the direction of each word is given by a pre-trained word embedding model. WMD can capture the nuances and subtleties of the meaning and context of the words, while cosine similarity can capture the overall similarity and topic of the texts. WMD is also more expensive to compute than cosine similarity since it requires solving an optimal transport problem. Regarding Hellinger distance, Hellinger distance is a symmetric and bounded measure that quantifies the difference in the square roots of the probabilities, while KL divergence is an asymmetric and unbounded measure that quantifies the difference in the logarithms of the probabilities. Cosine similarity is a symmetric and bounded measure that quantifies the angle between the probability vectors. Hellinger distance and KL divergence are often used for comparing discrete or multinomial distributions. Soft Cosine similarity depends on the quality and coverage of the word embedding model, and it may not account for the syntactic or structural differences between the documents.

At operation 250, in the example, the text clustering 120 constructs a similarity graph 252 using the similarity values of the similarity matrix 242. More specifically, the similarity graph 252 is constructed to include a node for each record 222 (e.g., for each vector 236). Further, edges are added between nodes when those two nodes are similar to each other (e.g., where the similarity value of the pairing exceeds a “similarity threshold”).

Figure 4:
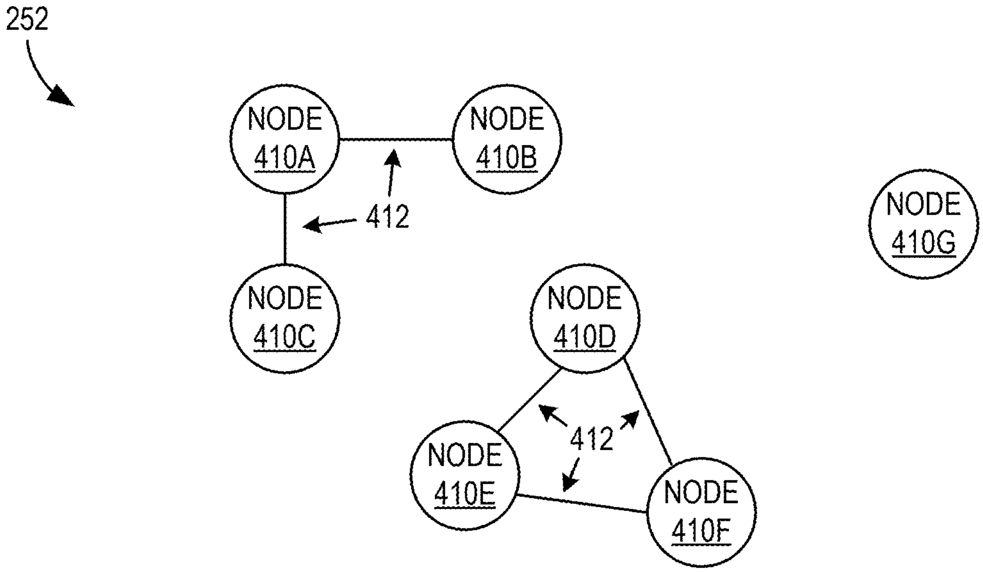
FIG. 4 is an example similarity graph.

FIG. 3 is a flow chart illustrating example operations for constructing the similarity graph 252 of shown in FIG. 2. FIG. 4 is an example similarity graph 252. Referring now to FIG. 3 and FIG. 4, in the example, at operation 310, the text clustering 120 adds a node 410A-410G (collectively, “nodes 410”) to the graph 252 for each row (or column) of the similarity matrix 252 (e.g., each vector 236, each record 222, where each vector 236 and/or record 222 have a unique identifier, each of which is associated with a particular row/column of the similarity matrix 242).

At operations 320-330, in the example, the text clustering 120 loops through each of the rows of the similarity matrix 242 to evaluate whether to add edges 412 between nodes. More specifically, at operation 320, the text clustering 120 starts an outer loop iteration with a particular row (e.g., row i of the similarity matrix 242, where its associated node referred to as the ‘current node’). At operation 322, the text clustering 120 begins an inner loop iteration for each remaining row (e.g., for each row j>i, where each of these particular nodes are referred to as the ‘other node’ during this inner iteration). At test 324, the text clustering 120 identifies the similarity value, from the similarity matrix 242, for the pairing of the current node and the other node (e.g., as the value of [i, j] in the matrix 242). If this similarity value exceeds a similarity threshold at test 324, the text clustering 120 adds an edge 412 between those two nodes 410 (e.g., the current node, i, and the other node, j) in the similarity graph 252 at operation 330. In some examples, the edges 412 are created as unweighted edges. In other examples, the edges 412 are created as weighted edges, where the weight of each edge is the similarity value computed for that particular node pair. In some examples, the text clustering 120 uses weighted edges to measure the importance or centrality of some nodes, using metrics such as “betweenness”, closeness, or eigenvector centrality based on the edge weights (e.g., as an “importance score”). In some examples, edge weights may be used to detect anomalies in the data (e.g., as an “outlier detector”, nodes that have any edge or lower similarity with other nodes).

If the similarity threshold is not exceeded at test 324, the inner loop continues back to operation 322, incrementing j to the next row of the similarity matrix 242 until the similarity between the current node, i, and all remaining nodes has been evaluated. Likewise, once the inner loop has concluded for the current node, i, the outer loop increments to the next node (e.g., i=i+1) and similarly starts another inner loop (e.g., evaluating other nodes of j>i). This outer loop concludes once each node has been evaluated as the ‘current node’ in the outer loop.

By way of example, consider the example similarity graph 252 of FIG. 4. In this example, node 410A has a similarity value with node 410B that exceeds the similarity threshold, and also has a similarity value with node 410C that exceeds the similarity threshold. As such, edges 412 are created between node 410A and 410B, as well as between node 410A and 410C. However, because the similarity value between node 410B and node 410C is less than the similarity threshold, no edge is created between those two nodes 410B, 410C. Further, node 410B and node 410C are similarly not connected to any of the other nodes 410D-410G. Nodes 410D, 410E, and 410F are each connected to the others, but none of those nodes 410D-410F are connected to any of the other nodes 410A-410C, 410G. Additionally, node 410G is not connected to any other nodes 410A-410F.

As such, the similarity graph 252 thus contains n nodes 410 (e.g., one for each record 222), and may contain one or more edges 412, where each edge 412 connects a pair of nodes 410 that have a similarity value that exceeds the similarity threshold.

Returning again to FIG. 2, at operation 260, in the example, the text clustering 120 uses the similarity graph 252 to identify clusters 124 in the graph.

Figure 5:
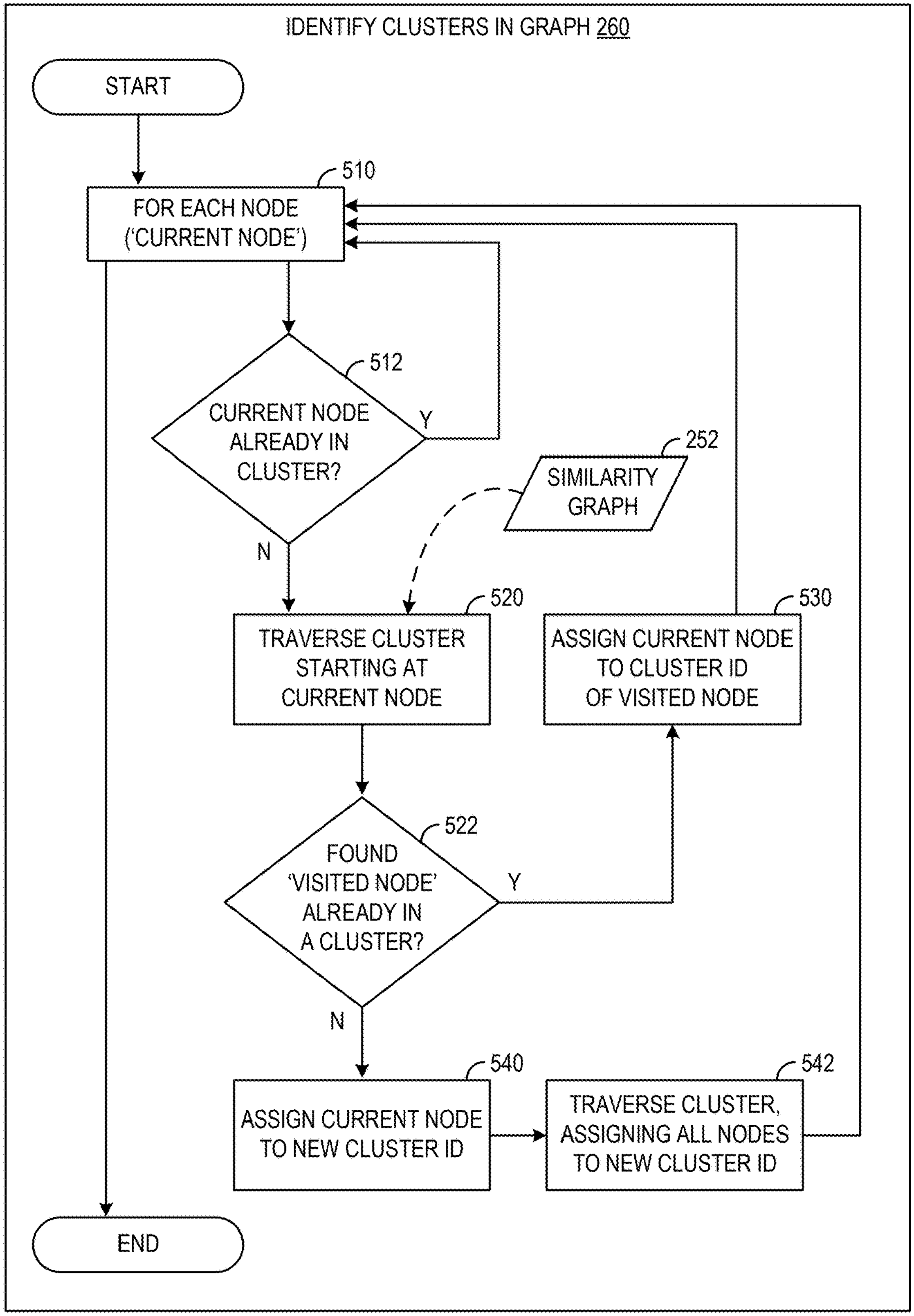
FIG. 5 is a flow chart illustrating example operations for identifying clusters in the similarity graph.

FIG. 5 is a flow chart illustrating example operations for identifying clusters in the similarity graph 252. At operations 510-540, in the example, the text clustering 120 loops through each of the nodes 410 of the similarity graph 252, assigning each node 410 to one and only one cluster. Because of the way the similarity graph 252 is constructed, each node 410 will be a part of only one cluster of one or more connected nodes 410. The text clustering 120 assigns a unique identifier to each cluster 124 that is identified during this operation 260.

More specifically, at operation 510, the text clustering 120 starts an outer loop iteration with a particular node 410 (a ‘current node’) within the similarity graph 252. At test 512, if the current node is already in a cluster (e.g., already assigned to a particular cluster ID), then the outer loop returns to operation 510 and advances to another node 410. Otherwise, at operation 520, the text clustering 120 traverses the similarity graph 252 starting at the current node. Because each node 410 is a member of one and only one cluster, traversing the similarity graph 252 starting at any particular node is effectively traversing a subset of the similarity graph (e.g., a sub-graph of only the nodes 410 that are connected to the current node). In other words, operation 520 traverses one cluster, starting at the current node. During this traversal, at test 522, if a node (e.g., ‘visited node’) is found that is already assigned to a particular cluster ID, then the current node is assigned to that cluster ID at operation 530 and flow returns to operation 510 and advances to another node.

If no visited nodes are found to be already assigned to a cluster ID, then the text clustering 120 generates a new cluster ID and assigns that new cluster ID to the current node at operation 540. Further, at operation 542, the text clustering 120 traverses the cluster starting at the current node (e.g., similar to operation 520) and assigns each of the connected/visited nodes in that cluster to the new cluster ID. After this traversal, flow returns to operation 510 and advances to another node.

Figure 6:
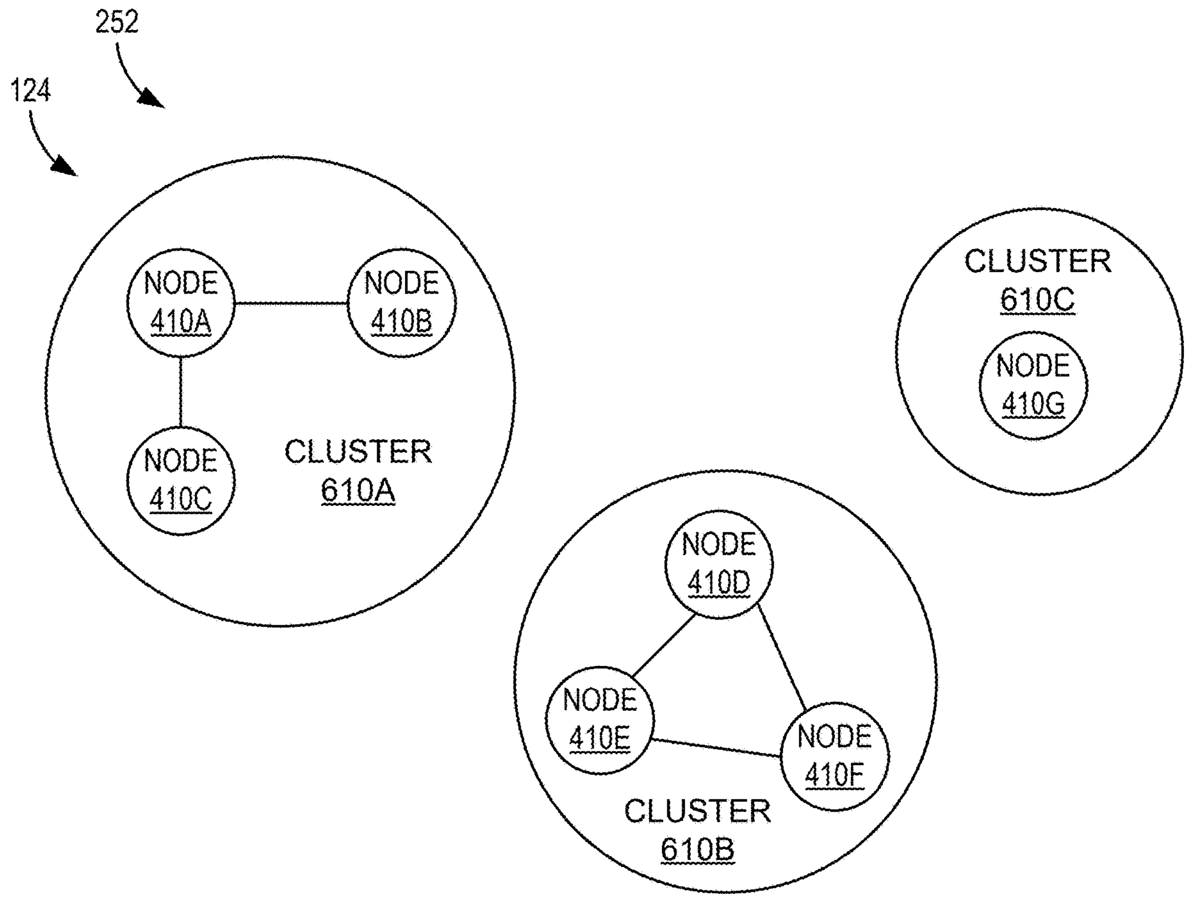
FIG. 6 is a diagram illustrating clusters that have been identified within the similarity graph.

FIG. 6 is a diagram illustrating clusters 124 that have been identified within the similarity graph 252. In the example, a first cluster 610A includes nodes 410A-410C, a second cluster 610B includes nodes 410D-410F, and a third cluster 610C includes node 410G, where clusters 610A-610C (collectively, clusters 610) are examples of clusters 124. Referring now to FIG. 5 and FIG. 6, presume, for example, that node 410A is initially the current node at operation 510. Initially, no cluster IDs exist. As such, this node 410A is not initially assigned to any cluster 124. As such, traversal of the similarity graph 252 starts at node 410A and visits both node 410B and 410C (e.g., at operation 520). As neither of these other nodes 410B, 410C are yet assigned to a cluster 124, 610, the text clustering 120 creates a new cluster ID (e.g., a unique integer, or other unique identifier) for this new cluster 610A and assigns this new cluster ID to node 410A (e.g., at operation 540). Further, the cluster 610A is again traversed and each other node 410B, 410C that is visited is also assigned to that same new cluster ID. As such, cluster 610A is fully formed and all nodes of that cluster 610A are identified and assigned. When the outer loop of operation 510 advances to inspect node 410B and 410C, each of those nodes 410B, 410C already have a cluster ID assigned (e.g., at test 512), and thus any further traversals are skipped and flow advances to other nodes.

Similarly, when node 410D is the current node, the text clustering 120 similarly traverses the cluster 610B, visiting nodes 410E and 410F, and identifying that none of those nodes 410D-410F are currently assigned to a cluster ID. As such, a new cluster ID is generated for cluster 610B, and all nodes 410D-410F are assigned to that new cluster ID. Likewise, when each of nodes 410E and 410F are the current node, they are already assigned to cluster 610B, and thus are skipped. When node 410G becomes the current node, the initial traversal identifies no other connected nodes and, as such, a new cluster ID is generated for cluster 610C and is only assigned to node 410G.

Accordingly, referring again to FIG. 2, the clusters 610A-610C become clusters 124 that are identified at operation 260. At operation 270, in examples, the text clustering 120 adds the cluster ID of each particular node 410 of the similarity graph 252 to each source record 122. For example, and referring again to FIG. 1, the text clustering 120 may update the database 106 for each source record 122 in the input dataset 108, storing the cluster ID of the node 410 associated with that record 122, 222. As such, the cluster relationships between the source records 122 (represented in FIG. 1 as clusters 124) may be retained and reused.

In examples, these clusters 124 are used by the other functions 130, 140, 150, 160. For example, consider the cluster pattern 130. The cluster pattern 130 is configured to use the clusters 124 identified by the text clustering 120 to generate a pattern 132 for any or all of the clusters 124. The cluster pattern 130, in examples, identifies all of the nodes 410 in a given cluster 124, 610 (each of which is associated with a source record 122 and optionally a masked record 222) and uses the text from those records 122, 222 to identify a REGEX pattern 132 that best describes (e.g., matches on, most minimally) all of those particular records 122, 222. The cluster pattern 130 identifies a common pattern for each cluster of records. A cluster consists of records that are very similar to each other, except for some minor variations. To find the pattern, the cluster pattern 130 compares each pair of records in the cluster and creates a template that replaces any differences or changes with a wildcard placeholder. In examples, the cluster pattern 130 uses the difflib library of Python to analyze the text of the nodes 410 of the particular cluster 124, 610 to generate the pattern 132 for that cluster 124, 610.

For example, presume a cluster 610 contains the following records:

TABLE 3

| Example Records for REGEX Pattern Determination. |
|---|
| 1. "56182-9ca1-4148-8ca9-f9f56f7","http://schemas /ws/20010/05/identity/claims/name":"test1@company.com","http://schemas /2005/05/identity/claims/upn":"test1@company.com",action:start, date:2005-01-12 |
| 2. "15987-9ca1-7894-3264-454646","http://schemas /ws/20010/05/identity/claims/name":"test2@company.com","http://schemas /2005/05/identity/claims/upn":"test2@company.com",action:update, date:2005-01-13 |
| 3. "78977-9ca1-8798-8787-14878","http://schemas /ws/20010/05/identity/claims/name":"test3@company.com","http://schemas /2005/05/identity/claims/upn":"test3@company.com",action:update, date:2005-01-14 |

| Example REGEX Pattern (e.g., template). |
|---|
| As such, the pattern 132 determined for this cluster is: "(*)-9ca1-(*)-(*)-(*)", "http://schemas /ws/20010/05/identity/claims/name":"test(*)@company.com", "http://schemas/2005/05/identity/claims/upn":"test(*)@company.com", action:(*), date:2005-01-(*) |

The example pattern/template shown in Table 4 is a concise and accessible way to examine the content of each cluster and speed up the process of reviewing the elements in the clusters. In the PII leak scenario, the pattern 132 helps to provide the user 102 with some context about the structure and format of the log entries that contain sensitive information, such as the source, destination, and type of PII. In examples, this pattern 132 is used to filter out records that match the template from a larger dataset, as they are likely to contain PII of the same type and format. This reduces the amount of data that needs to be further analyzed or protected, and also helps to identify the common sources and destinations of PII leakage. In examples, this pattern 132 is used to identify anomalies or outliers in the clusters, by comparing the records that do not match the template with those that do. This reveals potential errors, inconsistencies, or malicious activities in the data, such as missing, altered, or injected PII, or unusual patterns of data transfer or access.

In some situations, it can be difficult for the user 102 to see commonalities between nodes 410/records 122, 222 in any given cluster 124. As such, the pattern 132 for any given cluster 124, in some examples, provides a summary of that cluster 124 that may be displayed to the user 102 via the UI 190, thus allowing the user 102 to see what commonalities exist between the various nodes 410/records 122, 222 of that cluster 124 (which may be in the hundreds or thousands of individual records). In some examples, the pattern 132 is used to evaluate other input data (e.g., other source records 122 or masked records 222 that were not included in the original input dataset 108). For example, the cluster pattern 130 may apply additional records (not shown) to the one or more patterns 132 of the various clusters 124 to identify whether any of those additional records may match to any of the clusters 124 (e.g., and thus may be related to the underlying cause(s) shared by the nodes 410 of that cluster 124).

In examples, the cluster neighborhood 140 identifies clusters 124 that may be related to each other. For example, in some situations, the same root problem may have caused multiple clusters 124 to be created, or multiple distinct but related problems may have caused multiple clusters to be created. While the similarity threshold used by the text clustering 120 did not result in any of the nodes of those clusters 124 to be connected to each other (otherwise they would have ended up as a single, larger cluster 124), the cluster neighborhood 140 performs additional analysis to identify potentially related clusters.

Figure 7:
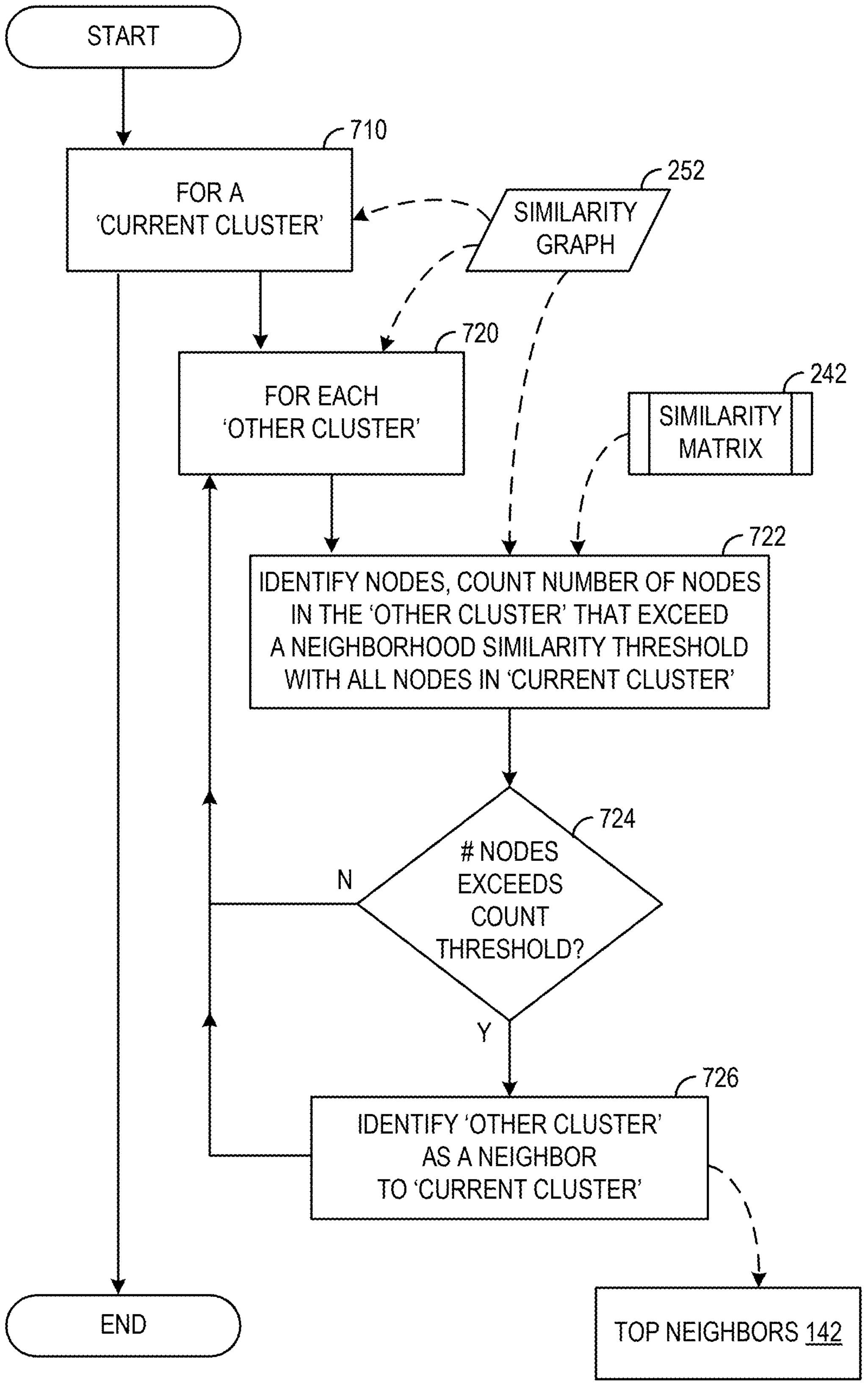
FIG. 7 is a flow chart illustrating example operations for identifying neighbor clusters (or "top neighbors") for a particular cluster (the 'current cluster')

FIG. 7 is a flow chart illustrating example operations for identifying neighbor clusters (or "top neighbors 142") for a particular cluster 124 (the 'current cluster'). In the example, the operations are performed by the cluster neighborhood 140 of FIG. 1 using the similarity graph 252 and similarity matrix 242 generated in FIG. 2. At operation 710, the cluster neighborhood 140 identifies a particular cluster 124 to analyze for other neighbor clusters. For example, presume that the cluster 610A of FIG. 6 is being analyzed for neighbors. At operation 720, the cluster neighborhood 140 analyzes each other cluster (e.g., clusters 610B, 610C, one at a time in an outer loop) in relation to the current cluster (e.g., cluster 610A).

For example, when comparing the cluster 610A to cluster 610B, at operation 722, the cluster neighborhood 140 uses the similarity matrix 242 to identify which nodes 410D-F, and a count of how many nodes 410D-F, in this other cluster 610B that exceed a neighborhood similarity threshold with any of the nodes in the current cluster 610A. In examples, this neighborhood similarity threshold is a value that is less than the similarity threshold used when creating the similarity graph 252. As such, the identification and counting of operation 722 finds node pairs between the current cluster 610A and the other cluster 610B that are not similar enough to have caused an edge to be formed between them during creation of the similarity graph 252, but that are somewhat similar (as they exceed the lower neighborhood similarity threshold). In some situations, a higher node count indicates a greater likelihood that the current cluster and the other cluster are somehow related (e.g., sharing a similar root cause or some other relation). At test 724, if the number of nodes identified in operation 722 exceeds a count threshold, this other cluster (e.g., cluster 610B) is identified as a neighbor cluster (e.g., a top neighbor 142) to the current cluster (e.g., cluster 610A) at operation 726. In other examples, the operation 722 and the test 724 may evaluate a percentage of paired nodes that exceed the neighborhood similarity threshold between the current cluster and the other cluster (e.g., >30% causing the other cluster to be identified as a neighbor cluster).

Returning again to FIG. 1, in examples, the cluster correlation 150 is configured to corollate clusters 124 across many batches (e.g., multiple input datasets 108 and their associated records 122, 222, similarity matrices 242, similarity graphs 252, and identified clusters 124 per batch), thereby allowing users 102 to identify correlations between multiple clusters from separate cluster sets (batches) over time. In examples, the clustering device 110 stores each of these data structures for the various batches that are clustered by the text clustering 120 for multiple input datasets 108. Each cluster 124 is given a persistent ID, or a correlated cluster ID (e.g., a unique set of cluster IDs across all batches). This feature allows multiple datasets 108 to be combined and clustered together in to correlated clusters 152.

In examples, the cluster editions 160 is configured to facilitate the merging and splitting of clusters 124 or correlated clusters. For example, the UI 190 may allow the user 102 to identify two or more clusters 124 from a particular dataset 108 and trigger a merging of those clusters 124 (e.g., in situations where the user 102 has determined that the two clusters 124 share a common root cause). As such, in some examples, the cluster editions 160 merges the clusters by assigning one of the cluster IDs (or a new cluster ID) to all of the nodes 410/records 122 of each of these clusters to this one shared cluster ID. In such situations, the sub-graphs of each prior cluster still remain segmented, but the shared cluster ID causes all of the nodes 410 of each of these clusters 124 to be viewed and evaluated as a single cluster 124.

In another example, the cluster editions 160 facilitates splitting a particular cluster 124 into multiple clusters. For example, the UI 190 may allow the user 102 to view the cluster 124 (e.g., the nodes 410 in the cluster 124, the records 122, 222 in the cluster 124) and select a particular split operation. One example split operation allows the user 102 to identify which cluster to be split and the cluster editions 160 automatically splits the records from that cluster. One example split operation may allow the user 102 to manually select which nodes 410 or records 122, 222 to split off into another cluster. Another example split operation may allow the user 102 to identify a split similarity threshold that is then applied, by the cluster editions 160, to the original similarity graph 252 (e.g., to the sub-graph of that cluster 610) and eliminate edges between nodes that do not exceed the split similarity threshold. Such an example splitting operation may or may not cause the original cluster 124 to segment into multiple clusters 610, and the UI 190 may allow the user 102 to view a proposed split based on the split similarity threshold and change that threshold until the user 102 achieves the desired separation. Upon confirmation of a split, the cluster editions 160 creates and assigns one or more new cluster IDs to the newly created clusters 124 and updates all of the nodes 410/records 122 in those new clusters 124 with the new cluster IDs. Such merge and split operations may be performed on clusters 124 or on correlated clusters 152.

The correlation function of the cluster correlation 150 identifies correlated clusters between multiple batches, while the merge/split function of the cluster editions 160 makes changes to particular clusters.

As an example of a merge/split function, presume from a given Batch A, the user 102 specifies the clusters to be merged. In an example, Merge(ClusterId_1, ClusterId_2)=ClusterId_3, results in ClusterId_1 and ClusterId_2 being removed and ClusterId_3 being created. In another example, from Batch A, the user 102 specifies the cluster to the split, Split (ClusterId_3)=ClusterId_4, ClusterId_5, causing ClusterId_3 to be removed and the nodes to be added to ClusterId_4 or ClusterId_5. During an example correlation, Correlate (All Clusters from Batch A, All Clusters from Batch B) identifies correlations as: CorrelatedClusterId_1=BatchA_ClusterId_1, BatchB_ClusterId_2, as well as CorrelatedClusterId_2=BatchA_ClusterId_2, BatchB_ClusterId_1. This correlation does not alter the clusters from Batch A and Batch B, but instead identifies and stores these correlations. As such, these correlations may be displayed to the user 102 as, for example, a 'combined view' of two separate clusters. In some examples, the user 102 identifies which sets of clusters (e.g., batches) to correlate. In some examples, the sets of clusters are automatically identified for correlation (e.g., automatically, triggered by a new input dataset 108 being processed by the text clustering 120).

In some examples, the operational features of any of the various functions 120, 130, 140, 150, 160 may be combined in various orders by the clustering device 110. For example, after performing a cluster merge or split operation by the cluster editions 160, or a cluster correlation operation, the newly merged/split clusters 162 or correlated clusters 152 may be submitted to the cluster pattern 130 for (re) creation of new patterns 132 (e.g., removing any prior pattern(s) that may have been created for the prior cluster(s) and recreating new patterns 132 based on the merge/split changes).

In some examples, any or all of the various data structures generated by the clustering device 110 (e.g., while processing a particular input dataset 108) may be stored (e.g., in the DB 106) for later use, whether by other functions of the clustering device 110, for viewing via the UI 190, or the like. For example, for any given batch (e.g., input dataset 108), the text clustering 120 may store any or all of the source records 122, masked records 222, vectors 236, vocabulary 232, scores 234, similarity matrix 242, similarity graph 252, and/or clusters 124 generated during cluster processing. Further, any or all of these data structures may be retrieved, updated, and stored by the various systems and methods described herein.

Figure 8:
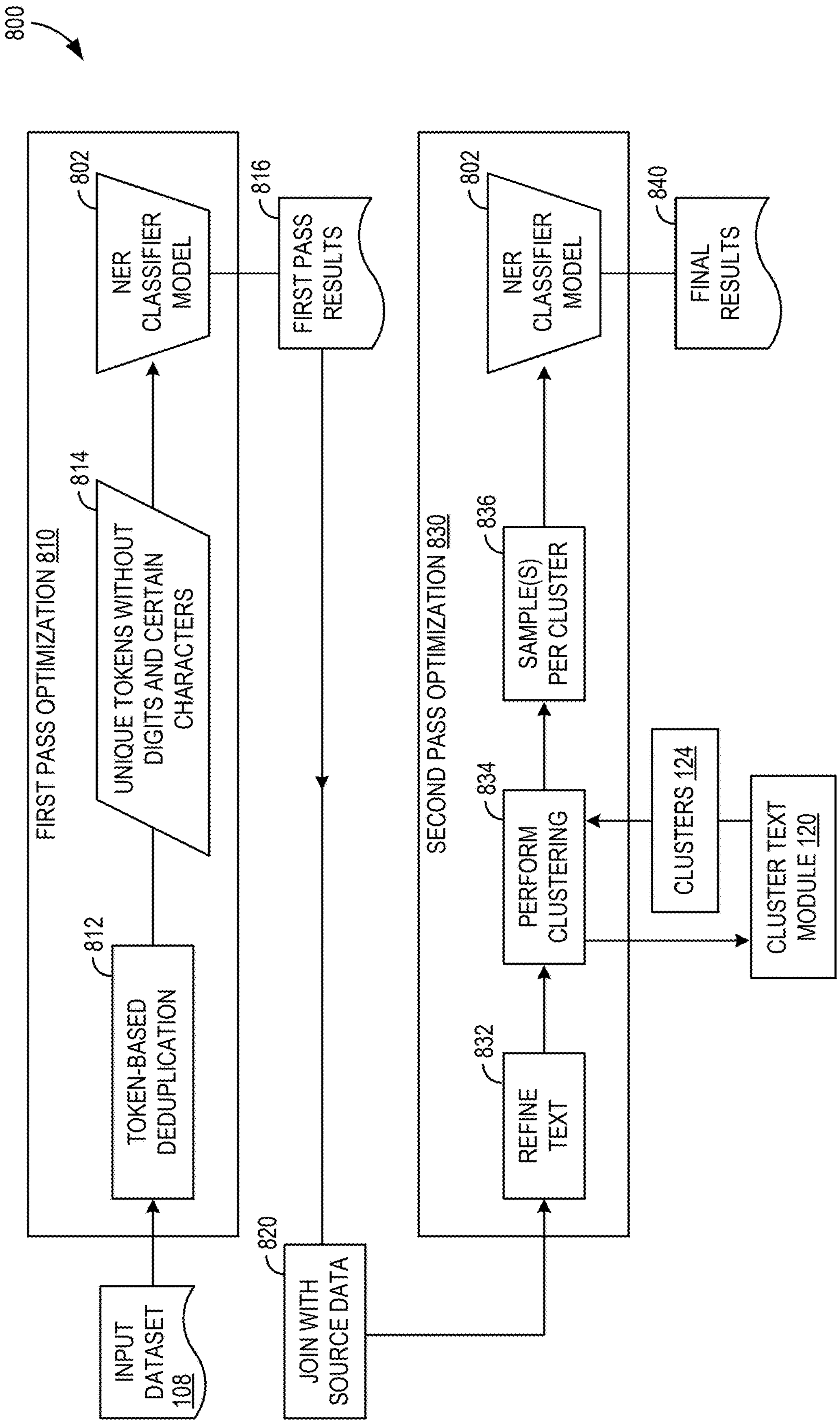
FIG. 8 is a diagram of a method for text analytics optimization for an example use case that analyzes security events associated with leaks of personally identifiable information (PII) during an enhanced privacy scan.

FIG. 8 is a diagram of a method for text analytics optimization 800 for an example use case that analyzes security events associated with leaks of PII during an enhanced privacy scan. In some examples, the operations shown and described for this use case are performed by the clustering device 110 of FIG. 1 and any of its associated functions 120, 130, 140, 150, 160. FIG. 8 shows how the clustering device 110 is used to optimize a two-step process for detecting PII leaks in logs. An example enhanced privacy scan function supported by the clustering device 110 provides functionalities for privacy teams to proactively detect privacy leaks in telemetry data (e.g., the input dataset 108) and helps find root causes of the PII leaks to resolve those issues.

In the example, the clustering device 110 receives the input dataset 108 and applies a first pass text analytics optimization to the dataset 108. The first pass optimization reduces the pool for scanning to tokens that are more likely to be PII leaks for target category (e.g., person name). At operation 812, the clustering device 110 performs token-based deduplication on the records 122 of the dataset 108, to filter out duplicate tokens and tokens that have digits and certain characters. This operation 812 results in unique tokens 814 without digits and certain characters. This reduces the number of tokens that are analyzed by the NER classifier model 802 (which is a computationally costly operation). These unique tokens 814 are then applied to a named entity recognition (NER) classifier model 802 that is designed to identify and categorize named entities within the unique tokens 814, yielding the first pass results 816 as output of the model 802. The NER classifier model 802 identifies and categorizes named entities, such as, for example, names, phone numbers, email addresses, and organization names. Each detection receives a confidence score (e.g., between 0 and 1), where the more certainty there is about the detection, the higher the score.

The first pass results 816 are then combined (e.g., joined) with the source data (e.g., the input dataset 108) at operation 820 (e.g., to locate the records that contain the tokens with named entities) before the clustering device 110 performs a second pass optimization 830. The second pass optimization 830 only scans representatives of records from groups of records with similar structures (e.g., same root cause). To do this, the clustering device 110 first trims (e.g., truncates) the text around the potential PII tokens and adds some padding (e.g., 50 characters) at operation 832. At operation 834, the clustering device 110 uses the text clustering 120 to find clusters 124 within the refined data (e.g., as described in relation to FIG. 2 to FIG. 6). At operation 836, the clustering device 110 selects one or more sample records from each cluster 124. These sample records are then input to the NER classifier model 802, which reduces the cost by analyzing fewer records and adds the confidence score representing the probability presence of PII leaks in the records from the first step with more context.

Figure 9:
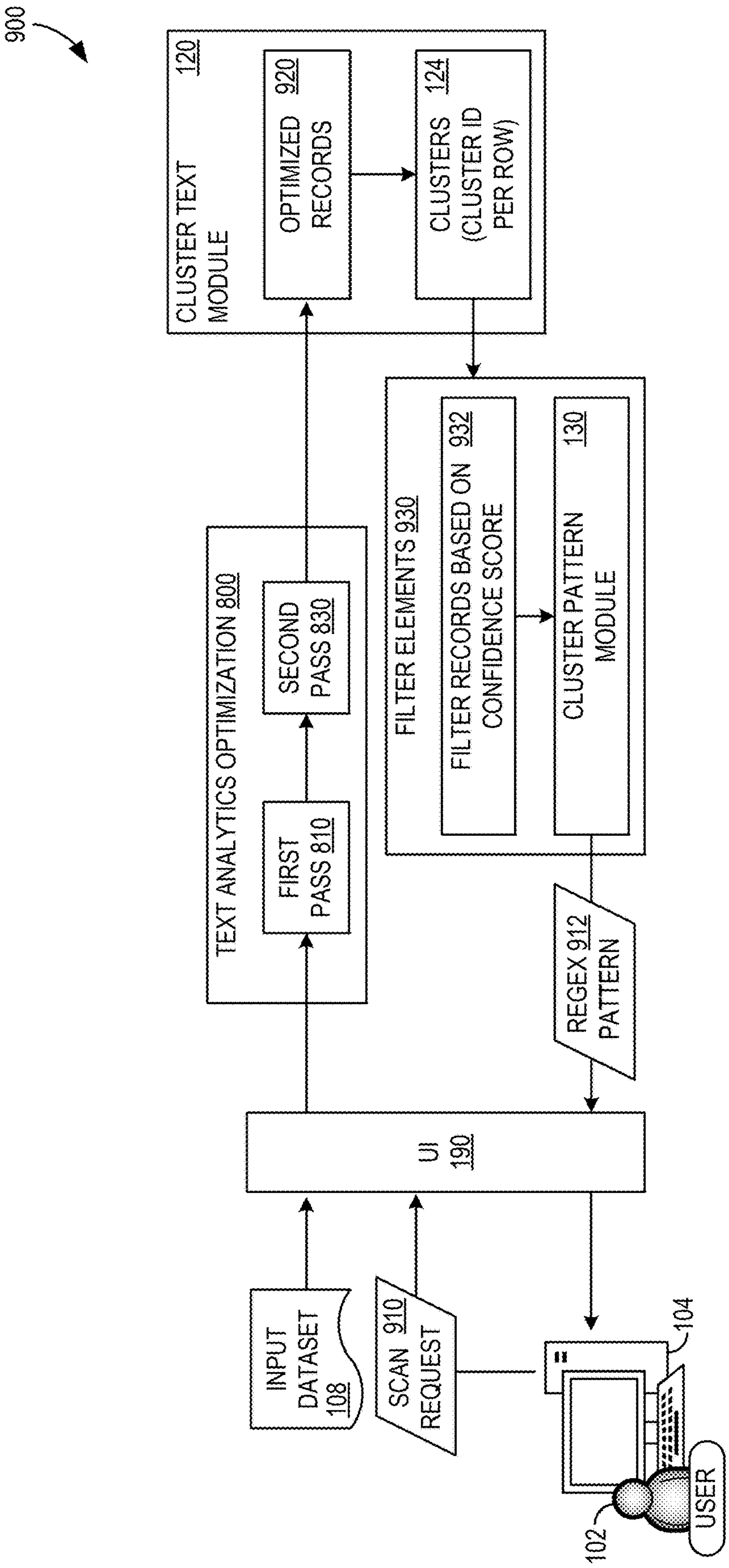
FIG. 9 is an example architecture in which the text analytic optimizations of FIG. 8 are used to identify clusters in an input dataset and to generate regular expression (REGEX) patterns for those clusters.

FIG. 9 is an example architecture 900 in which the text analytic optimizations 800 of FIG. 8 are used to identify clusters 124 in an input dataset 108 and to generate REGEX patterns 912 for those clusters 124. In some examples, any or all of the operations described herein are performed by the clustering device 110 of FIG. 1 and any of its functions 120, 130, 140, 150, 160. In the example, the user 102 submits, via the UI 190, a scan request 910 to the clustering device 110 to evaluate a batch of telemetry data for PII leaks. The scan request 910 includes or otherwise identifies the input dataset 108. Upon receipt of the scan request 910, the clustering device 110 accesses the input dataset 108 (e.g., reading the source records 122 from the DB 106, or the like).

In the example, the clustering device 110 performs text analytics optimizations 800 on the source records 122, as shown and described in FIG. 8. More specifically, the source records 122 are processed via the first pass 810 and the second pass optimization 830 to prepare the records 122 for clustering. Once optimized, the text clustering 120 performs clustering on the optimized records 920 to identify clusters 124 amongst those records 920. Once the clusters 124 have been identified, the clustering device 110 filters elements at operation 930, filtering records based on confidence score at operation 932. More specifically, after identifying the clusters 124, the clustering device 110 selects only the records within the clusters 124 that have a confidence score exceeding a predefined threshold (e.g., 0.5), as calculated by the NER model 802, to be presented to the user 102. This means that only the records with the highest probability of being PII leaks are used as input for the cluster pattern at operation 930. The records with a confidence score of less than the predefined threshold are filtered out at operation 932. The filtered records for each cluster are then sent to the cluster pattern 130 to generate a REGEX pattern 912 for each of the clusters 124. These REGEX patterns 912 are displayed to the user 102 via the user computing device 104 and the UI 190.

Figure 10:
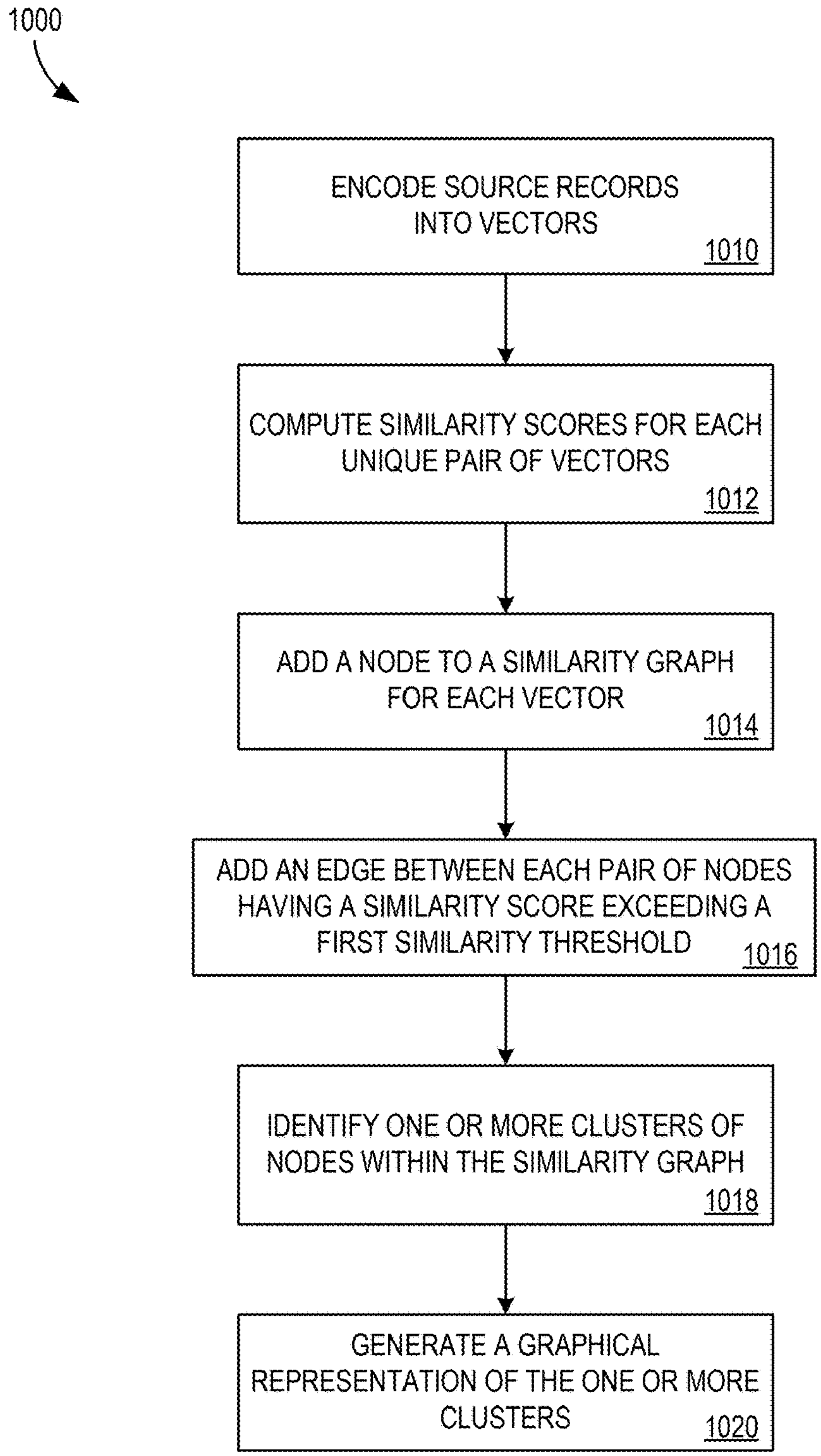
FIG. 10 is a flowchart illustrating exemplary operations performed by the system of FIG. 1 for identifying clusters within source data.

FIG. 10 is a flowchart 1000 illustrating exemplary operations performed by the architecture 100 of FIG. 1 for identifying clusters within source data. In examples, the operations are performed by the clustering device 110 on source records 122 of the input dataset shown in FIG. 1. At operation 1010, the clustering device 110 encodes a plurality of source records 122 into a plurality of vectors (e.g., vectors 236), each source record containing source terms being encoded as one vector of the plurality of vectors. In some examples, operation 1010 is similar to the encoding operation 230 shown in FIG. 2. At operation 1012, the clustering device 110 computes a similarity score (e.g., a cosine similarity score) for each unique pair of vectors of the plurality of vectors, the similarity score being a value representing how similar the two associated vectors are to each other. In some examples, computing a similarity score for each unique pair of vectors further comprises creating a similarity matrix based on the plurality of vectors, the similarity matrix comprising a plurality of elements, wherein each element of the plurality of elements stores one of the similarity scores for a particular pair of vectors.

In the example, the clustering device 110 constructs a similarity graph (e.g., similarity graph 252) by, at operation 1014, adding a node (e.g., nodes 410) to the similarity graph for each vector of the plurality of vectors, each node being associated with one vector of the plurality of vectors and one source record of the plurality of source records, and, at operation 1016, adding an edge (e.g., edges 412) between each pair of nodes in which the similarity score for the associated pair of vectors exceeds a first similarity threshold. At operation 1018, the clustering device 110 identifies one or more clusters of nodes (e.g., clusters 124, 610) within the similarity graph, each cluster of nodes representing a disconnected subgraph within the similarity graph. At operation 1020, the clustering device 110 generates a graphical representation of the one or more clusters on a display device.

In some examples, the clustering device 110 also generates a REGEX pattern (e.g., pattern 132, REGEX pattern 912) for a first cluster of nodes based on a first plurality of source records associated with that first cluster of nodes. In some examples, the clustering device 110 also identifies a second cluster of nodes as a neighbor cluster (e.g., top neighbor 142) of a first cluster of nodes based on similarity scores between pairs of nodes across the first and second cluster being above a second similarity threshold, the second similarity threshold being smaller than the first similarity threshold.

In some examples, the clustering device 110 also alters a first cluster of nodes based on user input, the alteration including one of (i) merging the first cluster with a second cluster and (ii) splitting the first cluster of nodes into second and third clusters of nodes. In some examples, the clustering device 110 also replaces at least one term in the plurality of source records prior to encoding, the replacing including replacing a data component of personally identifiable information with a mask term. In some examples, the clustering device 110 also creates a cluster ID for each cluster of nodes of the one or more clusters of nodes, and updates each source record of the plurality of source records with a cluster ID associated with the cluster of nodes in which the node associated with the source record appears within the similarity graph. In some examples, the clustering device 110 receives user input identifying the first cluster of nodes and a second cluster of nodes, updates first source records associated with the first cluster of nodes and second source records associated with the second cluster of nodes with a correlated cluster identifier, and displays the first cluster of nodes and the second cluster of nodes as correlated clusters based on the first and second source records having the correlated cluster identifier.

ADDITIONAL EXAMPLES

An example clustering system comprises: a processor; and a computer-readable medium storing instructions that are operative upon execution by the processor to: encode a plurality of source records into a plurality of vectors, each source record containing source terms being encoded as one vector of the plurality of vectors; compute a similarity score for each unique pair of vectors of the plurality of vectors, the similarity score being a value representing how similar the two associated vectors are to each other; construct a similarity graph by: adding a node to the similarity graph for each vector of the plurality of vectors, each node being associated with one vector of the plurality of vectors and one source record of the plurality of source records; and adding an edge between each pair of nodes in which the similarity score for the associated pair of vectors exceeds a first similarity threshold; identify one or more clusters of nodes within the similarity graph, each cluster of nodes representing a disconnected subgraph within the similarity graph; and generate a graphical representation of the one or more clusters on a display device.

An example method of clustering source data comprises: encoding a plurality of source records into a plurality of vectors, each source record containing source terms being encoded as one vector of the plurality of vectors; computing a similarity score for each unique pair of vectors of the plurality of vectors, the similarity score being a value representing how similar the two associated vectors are to each other; constructing a similarity graph by: adding a node to the similarity graph for each vector of the plurality of vectors, each node being associated with one vector of the plurality of vectors and one source record of the plurality of source records; and adding an edge between each pair of nodes in which the similarity score for the associated pair of vectors exceeds a first similarity threshold; identifying one or more clusters of nodes within the similarity graph, each cluster of nodes representing a disconnected subgraph within the similarity graph; and generating a graphical representation of the one or more clusters on a display device.

An example computer storage device has computer-executable instructions stored thereon, which, on execution by a computer, cause the computer to perform operations comprising: encoding a plurality of source records into a plurality of vectors, each source record containing source terms being encoded as one vector of the plurality of vectors; computing a similarity score for each unique pair of vectors of the plurality of vectors, the similarity score being a value representing how similar the two associated vectors are to each other; constructing a similarity graph by: adding a node to the similarity graph for each vector of the plurality of vectors, each node being associated with one vector of the plurality of vectors and one source record of the plurality of source records; and adding an edge between each pair of nodes in which the similarity score for the associated pair of vectors exceeds a first similarity threshold; identifying one or more clusters of nodes within the similarity graph, each cluster of nodes representing a disconnected subgraph within the similarity graph; and generating a graphical representation of the one or more clusters on a display device.

Alternatively, or in addition to the other examples described herein, examples include any combination of the following:

- encoding a plurality of source records into a plurality of vectors;
- source record contain source terms being encoded as one vector;
- computing a similarity score for each unique pair of vectors of the plurality of vectors;
- a similarity score being a value representing how similar the two associated vectors are to each other;
- constructing a similarity graph;
- adding a node to the similarity graph for each vector of the plurality of vectors;
- each node of a graph is associated with one vector;
- each node of a graph is associated with one source record;
- each vector is associated with one source record;
- adding an edge between each pair of nodes in which the similarity score for the associated pair of vectors exceeds a first similarity threshold;
- adding an edge between two nodes when a similarity score between those two nodes exceeds a first similarity threshold;

identifying one or more clusters of nodes within the similarity graph;

each cluster of nodes is a disconnected subgraph within the similarity graph;

generating a graphical representation of the one or more clusters on a display device;

displaying a list of one or more clusters on a display device;

displaying data from one or more source records associated with nodes in a cluster;

generating a REGEX pattern for a first cluster of nodes based on a first plurality of source records associated with that first cluster of nodes;

displaying a pattern of a first cluster;

applying a pattern to other records to determine whether or not the other records match the pattern;

identifying a second cluster of nodes as a neighbor cluster of a first cluster of nodes based on similarity scores between pairs of nodes across the first and second cluster being above a second similarity threshold, the second similarity threshold being smaller than the first similarity threshold;

altering a first cluster of nodes based on user input, the alteration including one of (i) merging the first cluster with a second cluster and (ii) splitting the first cluster of nodes into second and third clusters of nodes;

splitting a cluster of nodes into two or more clusters;

merging two clusters of nodes;

replacing at least one term in the plurality of source records prior to encoding;

replacing personally identifiable information with a mask term in a source record;

source records being rows of a log file;

source records being rows of a database table;

source records being documents;

creating a cluster ID for each cluster of nodes of the one or more clusters of nodes;

updating each source record of the plurality of source records with a cluster ID associated with the cluster of nodes in which the node associated with the source record appears within the similarity graph;

receiving user input identifying the first cluster of nodes and a second cluster of nodes;

updating first source records associated with the first cluster of nodes and second source records associated with the second cluster of nodes with a correlated cluster identifier;

receive user input identifying the first cluster of nodes and a second cluster of nodes, the second cluster of nodes having a second cluster identifier different than the first cluster identifier;

update first source records associated with the first cluster of nodes and second source records associated with the second cluster of nodes with a correlated cluster identifier, the correlated cluster identifier being different than both the first and second cluster identifiers;

displaying the first cluster of nodes and the second cluster of nodes as correlated clusters based on the first and second source records having the correlated cluster identifier;

create multiple clusters of nodes from multiple batches of input records; and identify a correlation between two or more clusters of nodes of the multiple clusters of nodes; and creating a similarity matrix based on the plurality of vectors, the similarity matrix comprising a plurality of elements, wherein each element of the plurality of elements stores one of the similarity scores for a particular pair of vectors.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
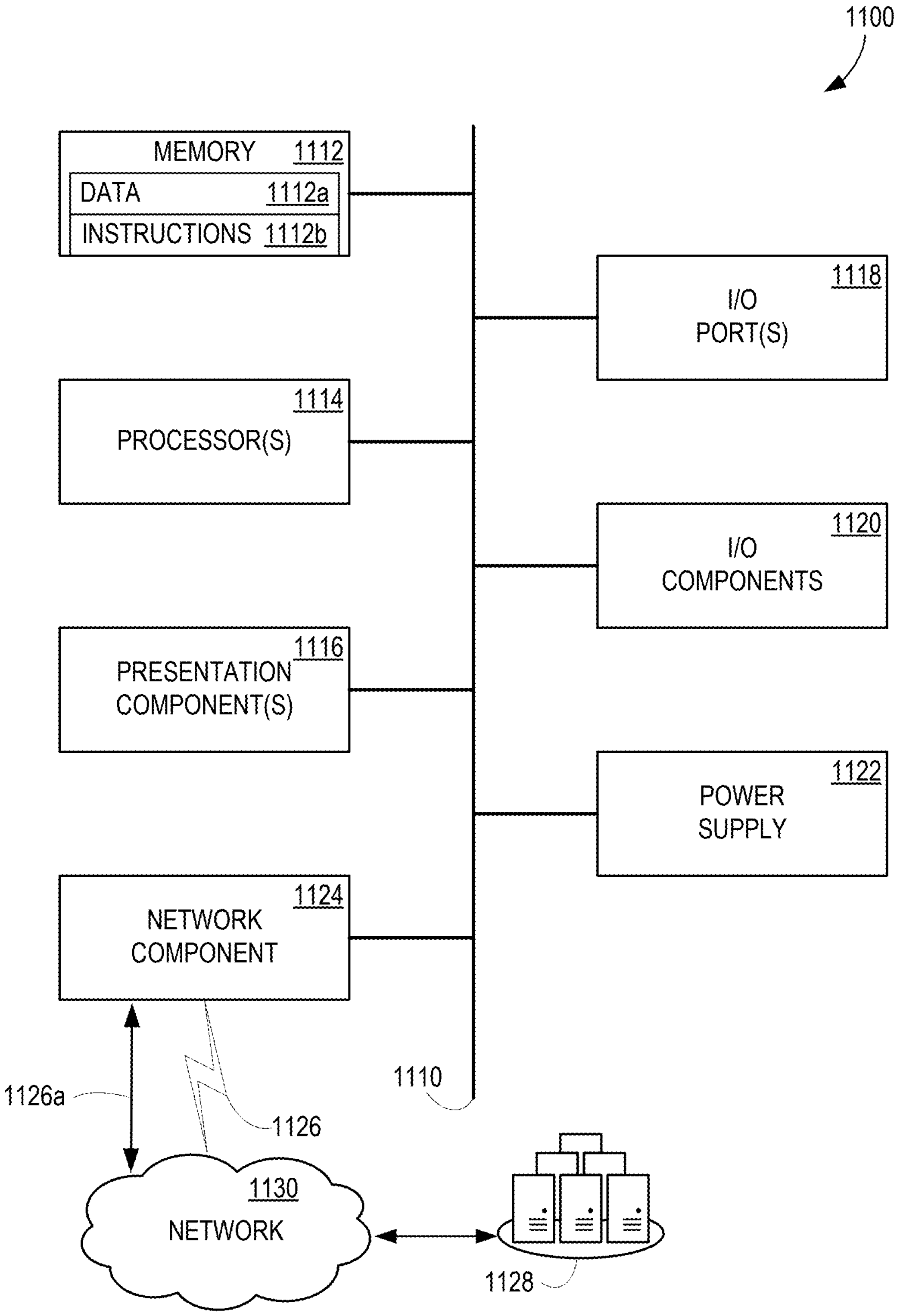
FIG. 11 is a block diagram of an example computing device (e.g., a computer storage device) for implementing aspects disclosed herein.

FIG. 11 is a block diagram of an example computing device 1100 (e.g., a computer storage device) for implementing aspects disclosed herein and is designated generally as computing device 1100. In some examples, one or more computing devices 1100 are provided for an on-premises computing solution. In some examples, one or more computing devices 1100 are provided as a cloud computing solution. In some examples, a combination of on-premises and cloud computing solutions are used. Computing device 1100 is but one example of a suitable computing environment and is not intended to suggest any limitation as to the scope of use or functionality of the examples disclosed herein, whether used singly or as part of a larger set. Neither should computing device 1100 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer storage memory 1112, one or more processors 1114, one or more presentation components 1116, input/output (I/O) ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 1112 may take the form of the computer storage media referenced below and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112*a* and instructions 1112*b* that are executable by processor 1114 and configured to carry out the various operations disclosed herein.

In some examples, memory 1112 includes computer storage media. Memory 1112 may include any quantity of memory associated with or accessible by the computing device 1100. Memory 1112 may be internal to the computing device 1100 (as shown in FIG. 6), external to the computing device 1100 (not shown), or both (not shown). Additionally, or alternatively, the memory 1112 may be distributed across multiple computing devices 1100, for example, in a virtualized environment in which instruction processing is carried out on multiple computing devices 1100. For the purposes of this disclosure, "computer storage media," "computer-storage memory," "memory," and "memory devices" are synonymous terms for the computer-storage memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

Computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1126*a* to a remote resource 1128 (e.g., a cloud resource) across network 1130. Various different examples of communication links 1126 and 1126*a* include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A clustering system comprising:
a processor; and
a computer-readable medium storing instructions that are operative upon execution by the processor to:
encode a source record into a first vector, the source record containing source terms being encoded by the first vector;
compute a similarity score for a first pair of vectors including the first vector and a second vector, the similarity score being a value representing how similar the first vector is to the second vector;
construct a similarity graph by:
adding a first node and a second node to the similarity graph for the first and second vectors; and
adding an edge between the first node and the second node based on the similarity score exceeding a first similarity threshold;
identify a first cluster of nodes within the similarity graph, the first cluster of nodes representing a disconnected subgraph within the similarity graph, the first cluster of nodes including the first and second nodes; and
generate a graphical representation of the first cluster of nodes on a display device.

2. The clustering system of claim 1, wherein the instructions are further operative to generate a regular expression (REGEX) pattern for the first cluster of nodes based on source record content associated with the first and second nodes.

3. The clustering system of claim 1, wherein the instructions are further operative to identify a second cluster of nodes as a neighbor cluster of the first cluster of nodes based on similarity scores between pairs of nodes across the first and second cluster of nodes being above a second similarity threshold, the second similarity threshold being smaller than the first similarity threshold.

4. The clustering system of claim 1, wherein the instructions are further operative to alter the first cluster of nodes based on user input, the alteration including one of (i) merging the first cluster of nodes with a second cluster of nodes and (ii) splitting the first cluster of nodes into at least third and fourth clusters of nodes.

5. The clustering system of claim 1, wherein the instructions are further operative to mask at least one term in the source record prior to the encoding, the masking including replacing a data component of personally identifiable information with a mask term.

6. The clustering system of claim 1, wherein the instructions are further operative to:
create a first cluster identifier for the first cluster of nodes; and
update the source record with the first cluster identifier.

7. The clustering system of claim 1, wherein the instructions are further operative to:
create multiple clusters of nodes from multiple batches of input records; and
identify a correlation between two or more clusters of nodes of the multiple clusters of nodes.

8. The clustering system of claim 1, wherein computing a similarity score for each unique pair of vectors further comprises creating a similarity matrix based on the first vector and the second vector, the similarity matrix comprising a plurality of elements, wherein each element of the plurality of elements stores one of the similarity scores for a particular pair of vectors.

9. A method of clustering source data, the method comprising:
encoding a plurality of source records into a plurality of vectors, each source record containing source terms being encoded as one vector of the plurality of vectors;
computing a similarity score for each unique pair of vectors of the plurality of vectors, the similarity score being a value representing how similar the two associated vectors are to each other;
constructing a similarity graph by:
adding a node to the similarity graph for each vector of the plurality of vectors, each node being associated with one vector of the plurality of vectors and one source record of the plurality of source records; and
adding an edge between each pair of nodes in which the similarity score for the associated pair of vectors exceeds a first similarity threshold;
identifying a cluster of nodes within the similarity graph, the cluster of nodes representing a disconnected subgraph within the similarity graph; and
generating a graphical representation of the cluster on a display device.

10. The method of claim 9, further comprising generating a regular expression (REGEX) pattern for the cluster of nodes based on a first plurality of source records associated with the cluster of nodes.

11. The method of claim 9, further comprising identifying a second cluster of nodes as a neighbor cluster of the cluster of nodes based on similarity scores between pairs of nodes across the cluster of nodes and the second cluster of nodes being above a second similarity threshold, the second similarity threshold being smaller than the first similarity threshold.

12. The method of claim 9, further comprising altering the cluster of nodes based on user input, the alteration including one of (i) merging the cluster of nodes with a second cluster and (ii) splitting the cluster of nodes into third and fourth clusters of nodes.

13. The method of claim 9, further comprising replacing at least one term in the plurality of source records prior to encoding, the replacing including replacing a data component of personally identifiable information with a mask term.

14. The method of claim 9, further comprising:

creating a cluster ID for the cluster of nodes; and updating each source record of the plurality of source records with the cluster ID associated with the cluster of nodes in which the node associated with the one source record appears within the similarity graph.

15. The method of claim 9, wherein computing a similarity score for each unique pair of vectors further comprises creating a similarity matrix based on the plurality of vectors, the similarity matrix comprising a plurality of elements, wherein each element of the plurality of elements stores one of the similarity scores for a particular pair of vectors.

16. A computer storage device having computer-executable instructions stored thereon, which, on execution by a computer, cause the computer to perform operations comprising:

encoding a plurality of source records into a plurality of vectors, each source record containing source terms being encoded as one vector of the plurality of vectors;

computing a similarity score for each unique pair of vectors of the plurality of vectors, the similarity score being a value representing how similar the two associated vectors are to each other;

constructing a similarity graph by:

adding a node to the similarity graph for each vector of the plurality of vectors, each node being associated with one vector of the plurality of vectors and one source record of the plurality of source records; and adding an edge between each pair of nodes in which the similarity score for the associated pair of vectors exceeds a first similarity threshold;

identifying a cluster of nodes within the similarity graph, the cluster of nodes representing a disconnected subgraph within the similarity graph; and generating a graphical representation of the cluster of nodes on a display device.

17. The computer storage device of claim 16, the operations further comprising generating a regular expression (REGEX) pattern for the cluster of nodes based on a first plurality of source records associated with the cluster of nodes.

18. The computer storage device of claim 16, the operations further comprising identifying a second cluster of nodes as a neighbor cluster of the cluster of nodes based on similarity scores between pairs of nodes across the cluster of nodes and the second cluster of nodes being above a second similarity threshold, the second similarity threshold being smaller than the first similarity threshold.

19. The computer storage device of claim 16, the operations further comprising altering the cluster of nodes based on user input, the alteration including one of (i) merging the cluster of nodes with a second cluster and (ii) splitting the cluster of nodes into third and fourth clusters of nodes.

20. The computer storage device of claim 16, the operations further comprising replacing at least one term in the plurality of source records prior to encoding, the replacing including replacing a data component of personally identifiable information with a mask term.

* * * * *